United States Patent [19]

Henrion et al.

[11] 4,076,964

[45] Feb. 28, 1978

[54] TIME DIVISION SYSTEM FOR SYNCHRONIZING FUNCTIONS CONTROLLED BY DIFFERENT CLOCKS

[75] Inventors: Michel André Robert Henrion, Boulogne; André Lucien Coudray, Rueil-Malmaison, both of France

[73] Assignee: International Standard Electric Corporation, New York, N.Y.

[21] Appl. No.: 708,816

[22] Filed: Jul. 26, 1976

[30] Foreign Application Priority Data

Jul. 28, 1975  France ................................ 75 23460

[51] Int. Cl.² ............................................. H04J 3/06
[52] U.S. Cl. ............................................. 179/15 BS
[58] Field of Search .................................. 179/15 BS

[56] References Cited

U.S. PATENT DOCUMENTS

| | | | |
|---|---|---|---|
| 3,729,717 | 4/1973 | de Koe et al. | 179/15 BS |
| 3,798,378 | 3/1974 | Epstein | 179/15 BS |
| 3,808,368 | 4/1974 | Pitroda et al. | 179/15 BS |
| 3,809,820 | 5/1974 | Sullivan | 179/15 BS |
| 3,867,579 | 2/1975 | Colton et al. | 179/15 BS |
| 3,920,918 | 11/1975 | Thomas | 179/15 BS |
| 3,959,588 | 5/1976 | Kelly et al. | 179/15 BS |
| 3,970,796 | 7/1976 | Gyurki | 179/15 BS |

*Primary Examiner*—Thomas W. Brown
*Attorney, Agent, or Firm*—James B. Raden; Marvin M. Chaban

[57] ABSTRACT

Synchronization control circuit for a time divisional data transmitting and receiving system. Data is received at an exchange at a clock rate determined by the transmitting station and is stored in memory at that rate. Read-out of data from the memory is based on the internal clock rate of the exchange. Since only one operation — read or write — can occur on a memory at any one time and the operations are controlled at rates which may be out of synchronism with one another, conflicts may occur. To prevent such conflicts, a time shift of predetermined duration is inserted between operations when the out-of-synchronism interval is less than a predetermined time interval.

5 Claims, 7 Drawing Figures

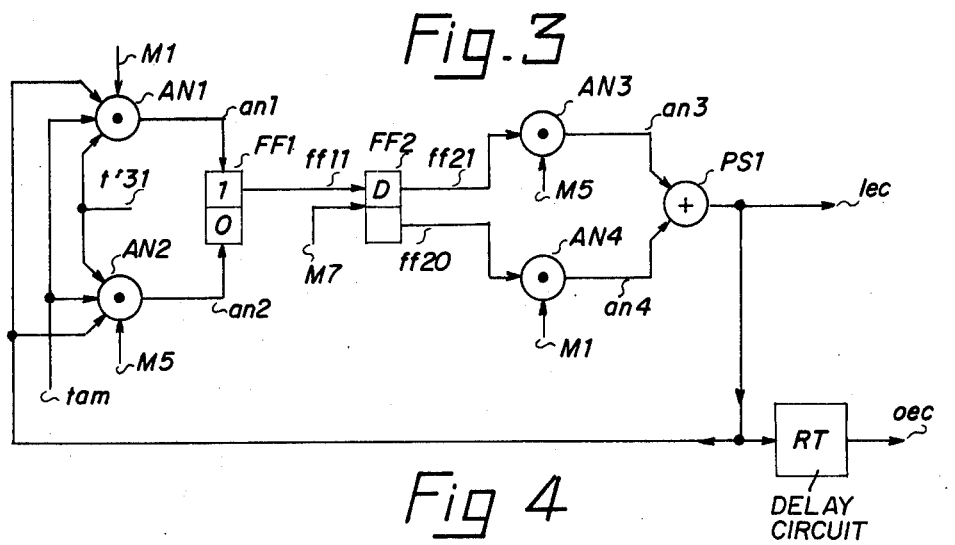
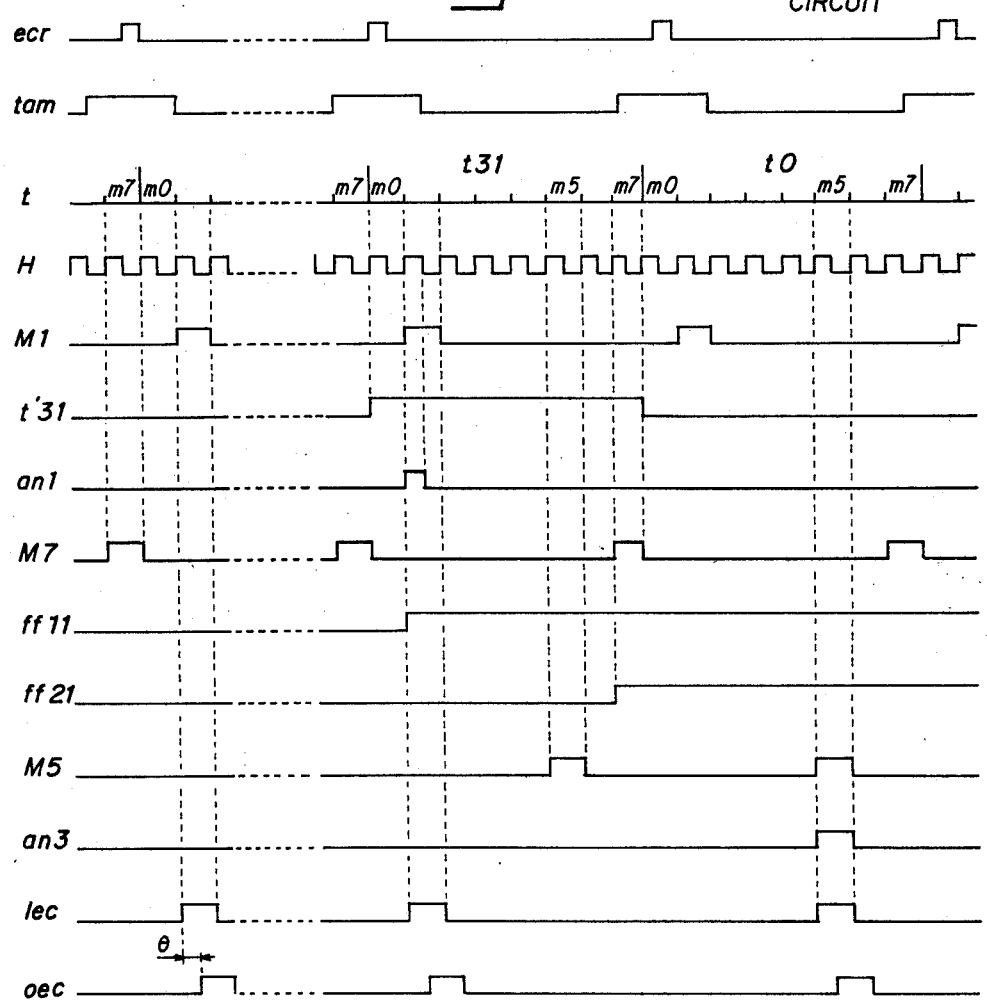

TIME DIVISION SYSTEM FOR SYNCHRONIZING FUNCTIONS CONTROLLED BY DIFFERENT CLOCKS

BACKGROUND OF THE INVENTION

The present invention has as its object a process and means for resynchronizing frame-structured incoming information. It is designed for use in time-division switching systems for coded signals, preferably in telephone exchanges employing the time-division switching of pulse code modulation signals.

At the inputs of such an exchange, the signals originating from the lines in operation may be sampled at a rate such as 8 kHz, and each sample may be translated by a coder into an eight bit binary signal combination. Each combination may be transmitted in series along a conductor, within a very short time interval making up a time channel. It is thus possible to time-multiplex 32 channels, for instance. The repetition period of the successive recurrences of a channel is of 125μs; with the time slot alloted to each channel being a duration of about 3.9μs. In the usual case, an input primary multiplex group is used to route signals originating from 30 lines occupying 30 time channels, with two time channels being used for the signalling and the synchronization. A similar output primary multiplex group routes the signals intended for these same 30 lines.

Inside the exchange, there will generally be numerous input and output multiplex groups. It is necessary that a coded combination originating along a time channel of a multiplex group be transmitted along a time channel of that multiplex group. This implies space switching operations for the group-to-group connections, and time switching operations for the channel-to-channel connections. These operations should be performed with the help of a network which may include switching units and memories: this network can be of a well-known type so-called time-space-time.

In a multiple exchange network, each exchange will be connected to a neighboring exchange by multiplex groups of the type described above. At the output of an exchange, the output multiplex group is formed by a local clock which defines the frames, the time slots, as well as the eight bit intervals or moments of each time slot.

At the input, in the exchange considered here, it is not possible to use the local clock for operating the signals from the input multiplex group, since it is not necessarily in frequency synchronism nor — and above — in phase synchronism with the clock of the distant exchange such as it would appear through the middle of transmission. It is therefore necessary to reset the distant clock for detecting and identifying the received signals.

Due to frequency differences between the distant clock and the local clock, and/or due to propagation time variations along the transmission channel, the position of the regenerated binary signals is randomly situated with respect to the local clock. When the digital flow from the input multiplex is greater than the local digital flow determined by the local clock, it has received more bits than the bits the exchange is able to process. In the other case where the digital flow from the input multiplex is smaller than the local digital flow, a number of bits is received smaller than the number of bits that the exchange requires.

The input groups originating at distant exchanges are associated with one or more reset clocks whose frequency and phase are different from those of the local clock and different from one another. It is therefore advisable to proceed with a resynchronization which will result in a time shift of the signals and, according to the direction of the frequency shift, into periodical doubling or suppression of incoming signals.

The solution includes the storing of input combinations in a memory at the rate of the distant clock, a memory location being assigned to each channel, and then to read therein the combinations at the rate of the local clock. But that sets a problem in case it is required to use a memory having simple storing and reading control circuits, because it will periodically happen that a storing operation might be required at the same time as a reading operation whereas the memory can only accomplish one of these two operations at a time.

Many solutions have been submitted for this problem, frequently including two memories with complex and costly logic control circuits.

SUMMARY OF THE INVENTION

The present invention provides a simple solution to this problem, enabling full resynchronization with only one memory.

The invention has for object a process of resynchronization of incoming frame-structured information, repetitive of time intervals, constituting time channels and conveying each coded combination so as to provide outgoing information, having the same structure, with the help of a distant clock reconstituted from the incoming information structure, and using a local clock to determine the structure of the outgoing information. The present invention has as its main object a circuit for controlling the storing of input information into a junction memory at the rate of one storing operation per input combination and reading the output information from the junction memory at the rate of one reading operation per output combination. In order that the storing and reading operations should always be distinct, we time shift one of these operations by a predetermined duration in case of collision, that is to say when the interval separating them has become shorter than a predetermined value.

Another feature of the process in the present invention is that one of the two operations — storing or reading — is performed at one of two predetermined moments within each time interval and the shifting of the operation is obtained by changing moments.

The present invention also has for object a resynchronizing device for frame-structured incoming information, repetitive at time intervals, defining time channels and conveying in each a coded combination. The function of the circuit is to provide outgoing information having the same structure as the incoming information and which uses clock signals derived from the structure of the incoming information, and a local clock determining the structure of the outgoing information. This present circuit comprises a junction memory with cells for storing temporarily each successive coded combination from an input time channel and transmitting them on an output time channel. Included further is a circuit controlled by the distant clock for receiving the input coded combinations and storing them into the appropriate memory cells. Also provided is a circuit controlled by the local clock for reading the output combinations from the appropriate memory cells and then transmitting them. In addition, there is an exclusion circuit provided in order that the storing and writing operations performed in the memory should be separated in time and which to that end comprises means for evaluating the interval separating the storing and reading operations, and, means controlled by the foregoing ones for time shifting one the operations for a predetermined duration in case of collision.

Another feature of the device in the present invention includes means in the exclusion circuit for evaluating the interval separating the storing and reading operations for originating a pre-collision damping signal setting a time space enframing one of the operations, either storing or reading, and further includes means for detecting the coincidence of this damping signal with a signal controlling the performance of the other said operation, reading or storing to originate a signal announcing a collision.

Another feature of the present invention includes means provided in the said exclusion circuit, for time shifting one of the operations by a predetermined duration, based on the principle of originating from one of the distinct or local clocks two control signals of one of the said operations — storing or reading — distinct one from the other inside each time interval, as well as switching means controlled by said signal announcing a collision and arranged for detecting and operation of one of the two control signals.

Various further features and objects of present invention will now be disclosed from the following description which is given by way of non-limited example and with reference to the accompanying drawings:

BRIEF DESCRIPTION OF THE DRAWINGS

FIG. 3 shows an embodiment of the exclusion circuit XC in FIG. 1, FIG. 4 shows chronograms illustrating the operation of the exclusion circuit XC in FIG. 3.

Figure 1:
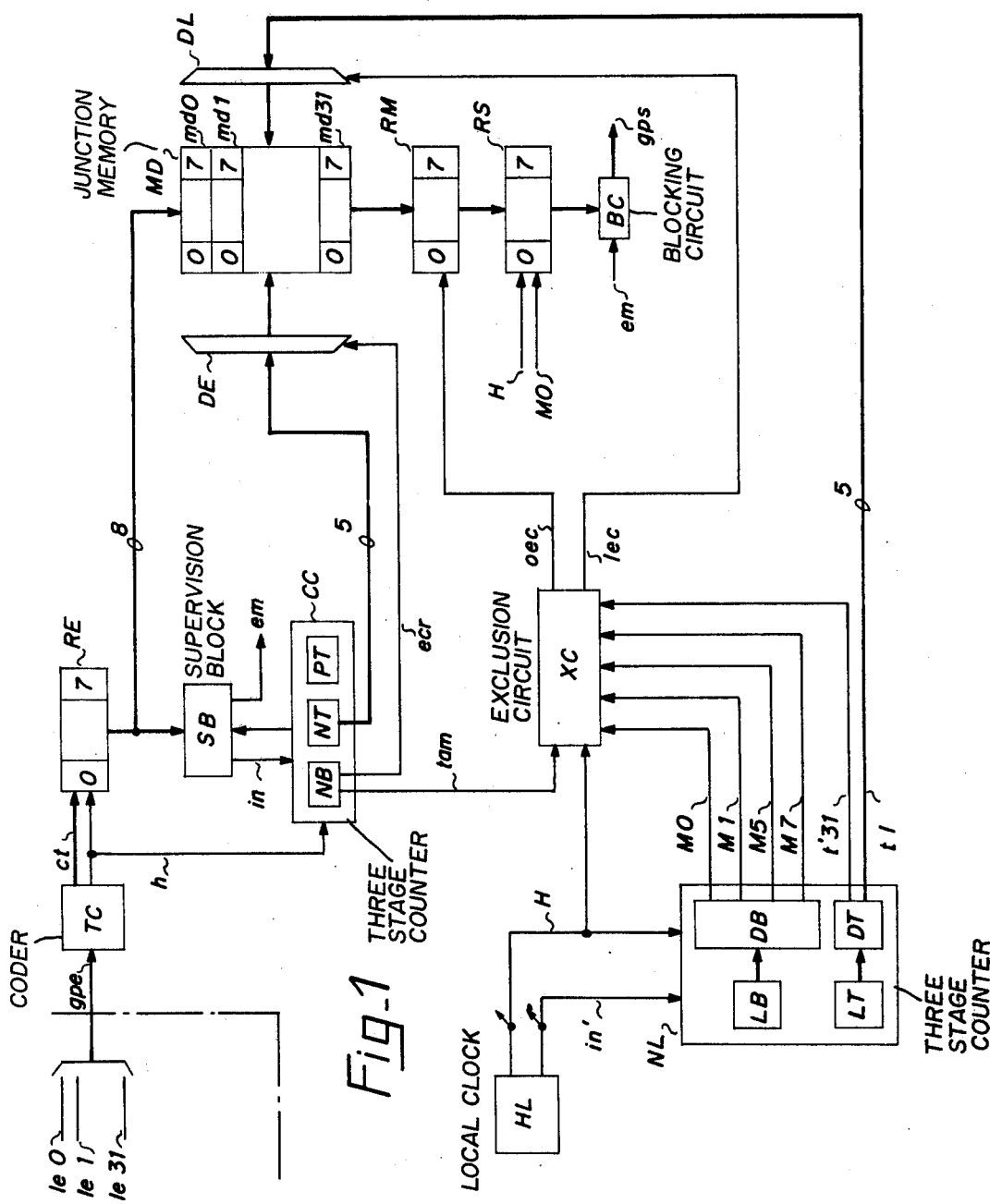
FIG. 1 shows a block diagram of a resynchronizing circuit according to the present invention.

By reference to FIG. 1, we will describe the block diagram of a resynchronizing circuit for incoming information in a digital switching exchange conformable to present invention.

Thirty two input lines le0, le1, ..., le31, belonging to a distant exchange are multiplexed upon an incoming group $gpe$ through means not shown here.

In the circuit of FIG. 1, a transcoder TC receives the signals of group $gpe$ and provides, in $ct$, the corresponding binary signals and, in $h$, a distant clock signal, which includes one impulse per bit received with the appropriate phase with respect to the signals provided in $ct$.

A shift register RE, having eight stages 0 to 7, controlled by the distant clock impulses $h$, receives in series the eight bits $ct$ of each coded combination. As soon as the eighth bit is received, it retransmits in parallel the eight bits to a junction memory MD and to a supervision block SB.

The junction memory MD is a random access memory comprising 32 memory cells $md0$, $md1$, ..., $md31$ for storing the eight bits of a coded combination. Every one of these cells is associated with a time channel, therefore with an input line. Thus, the coded combination originating from the input line $le0$ is stored in the memory cell $md0$, the coded combination originating from the input line $le1$ is stored in memory cell $md1$ and so on; the coded combination originating from input line $le31$ being stored in memory cell $md31$.

By time multiplexing principle, time is divided into identical sampling periods of 125$\mu$s frames. Each frame is divided into 32 identical time intervals of about 3.9$\mu$s. During every time interval an 8 bit coded combination at the rate of one bit every 488 ns is transmitted. To make possible the identification of the frames, a synchronization code is transmitted during a determined period of time, for instance at the frame beginning. The supervision block SB functions to detect this synchronization code. It will provided, namely, in the absence of that code, a blocking signal $em$. It will also provide at the starting of the system and at the first reception of that code, a resetting signal $in$ directed towards a countr device CC.

The counter device CC, controlled by impulses $h$ of the distant clock, comprises counters NB, NT and PT. Counter NB is a three stage-counter. It steps one step at each impulse $h$. It restores to 0 position at the beginning of each input combination of 8 bits and it constantly provides the number, from 0 to 7, of the bit received. As will be seen subsequently, for a certain position, this counter provides a signal $ecr$ and a signal $tam$. The counter NT is a five stage counter. It steps one step under the control of a clock impulse $h$ when the counter NB restores to 0 position. It is in 0 position at the beginning of each input frame and it provides the number, from 0 to 31, of the incoming time channel inside a frame; therefore also, as was already seen above the number of the cell of the junction memory MD in which is stored the coded combination provided by the input register RE. This number is therefore provided to a storing addresses decoder DE associated with memory MD. Counter PT is a one bit counter which defines the parity of each frame.

The exchange considered here comprises a local clock HL common (multiplying arrows) to all the circuits such as the one in FIG. 1. This clock provides impulses H to counter device NL and to an exclusion circuit XC.

The counter device NL, controlled by impulses H and restored to zero by a signal $in'$ originating from the local clock HL, comprises two counters LB and LT and their associated decoding circuits DB and DT.

Counter LB comprises three stages. It steps one step at each impulse H. It constantly defines the number, from 0 to 7, of each 488 ns characteristic moment $m0$ to $m7$ of each of the time slots $t0$ to $t31$ assigned respectively to the time channels of an outgoing multiplex group $gps$. It restores to zero at the beginning of each outgoing combination. The decoding circuit DB which is associated with it provides impulses M0, M1, M5 and M7 when counter LB occupies positions 0, 1, 5 and 7 respectively.

Counter LT comprises five stages. It steps one step under the control of a clock impulse H when counter LB restores to position 0. It is in position 0 at the beginning of each output frame and it provides the number $t1$, from 0 to 31, of the outgoing time channel inside a frame, therefore, also the number of the cell of the junction memory MD to be read. This number is therefore provided to a reading addresses decoder DL associated with memory MD. The decoding circuit DT associated with the counter LT provides an impulse $t'31$ when this counter is in position 31.

The exclusion circuit XC which receives signals *tam*, M0, M1, M5, M7, $t'31$ and clock impulses H provides in response a reading signal *lec* to the reading addresses decoder DL. In the presence of that signal, the coded combination stored in the memory cell defined by the address $t1$ is read. This coded combination is stored in a first output register RM under the control of an impulse *oec* provided by the exclusion circuit XC. It is then transferred into a second output register RS, under the control of an impulse M0, and then to the recipient output line of an outgoing multiplex group *gps* via a blocking circuit BC controlled by the blocking signal *em* originating from the supervision block SB. It will be assumed that the transmission is accomplished in paralled form. In that case, the blocking circuit is a simple logic gate.

Now will be described, in also referring to the chronograms in FIG. 2, the operating process of the circuit in FIG. 1.

Figure 2:
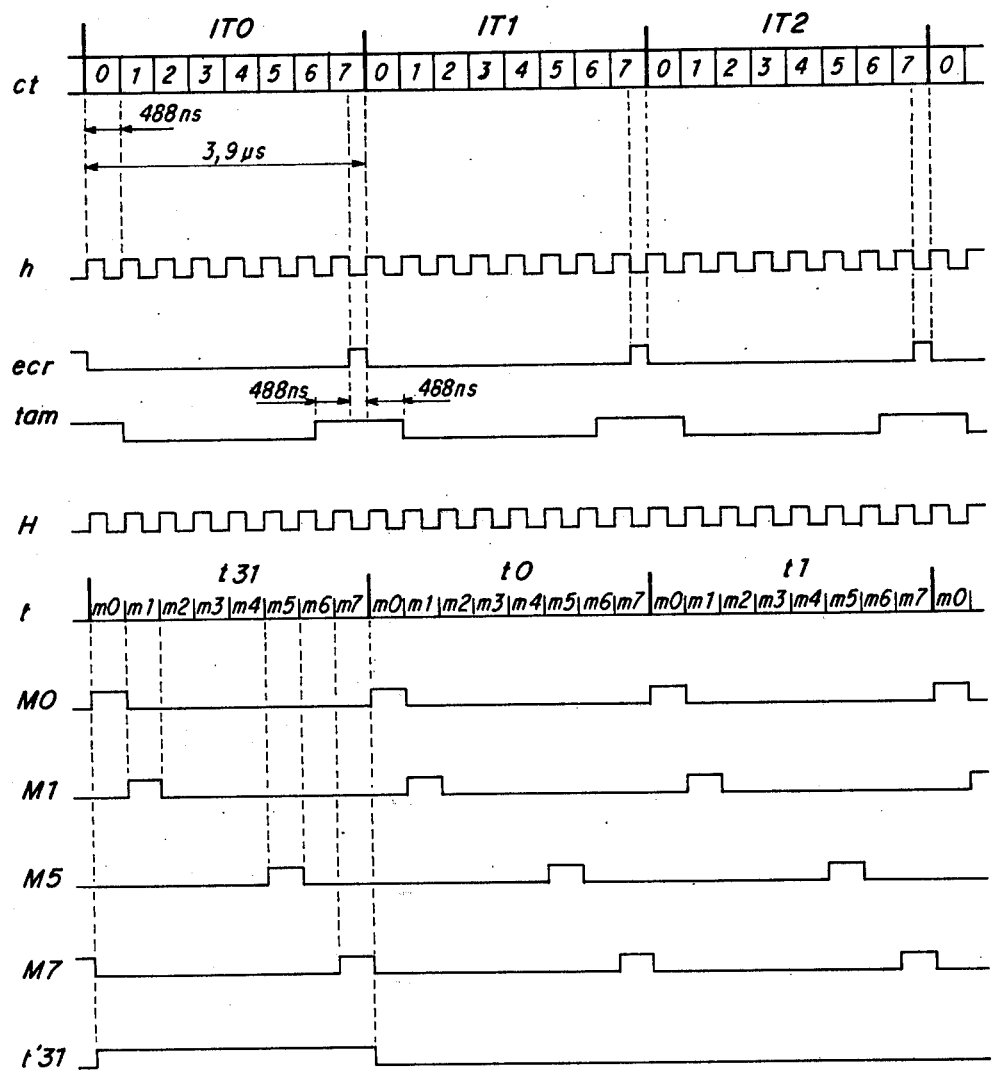
FIG. 2 shows a set of chronograms defining the various signals utilized in the circuit of FIG. 1.

On the first line of FIG. 2 is being shown the coded combinations *ct*, originating from the input lines *le*0, *le*1 and *le*2 of group *gpe*, and which occupy the time slots IT0, IT1 and IT2 respectively. Each coded combination comprises eight bits 0 to 7 transmitted at the rate of one bit at about every 488 ns to the input register RE. This register receives also the distant clock impulses *h* provided by the transcoder TC. Each combination is stored into a cell of the junction memory MD as soon as the eighth bit has entered into the input register RE. To that end, the counter NB provides a storing impulse *ecr*. This impulse is illustrated by the chronogram *ecr* in FIG. 2. The counter NB provides also a damping impulse *tam* which starts 488 ns before storing impulse *ecr* and which ends 488 ns after the end of that impulse.

This operating process is of a systematic nature. As long as the transcoder TC provides the reconstituted impulses *h* of the distant clock, the counters of block CC step on and when counter NB provides signal *ecr*, the address provided by counter NT is used to store the contents of register RE into a cell of memory MD. In normal operation, the supervision block SB has synchronized one another the counters NB, NT and PT; and the combinations *ct* are stored one by one into cells *md*0 to *md*31 for each frame of the input group.

There now remains to determine the instant of reading, at the local clock rate, of the stored coded combinations. According to the process of present invention in order to avoid any simultaneity between the reading operations and the storing operations, a reading impulse *lec* will be provided in the absence of impulse *tam* and distant enough from that impulse so as to be safe at the maximum from the buffer-reading collisions due to a possible jitter from the distant clock with respect to the local clock.

The combinations stored in the memory MD are read at the rate of the local block HL once every $3.9\mu s$. The stepping of the counters constituting NL is controlled by a clock signal H to 2.048 MHz (identical to *h*); a synchronisation signal *in'* initiates counters LB and LT when the synchronisation system is set into operation.

Counter LT of the arrangement NL defines, namely, the $3.9\mu s$ time slots $t0$ to $t31$, assigned respectively to the output lines of the multiplex group *gps*; and the counter LB defines the eight 488 ns characteristic moments, $m0$ to $m7$ of each of these time slots.

It will now be assumed that the reading impulse *lec* is provided during the characteristic moment $m1$, that is to say at the same time as impulse M1 provided by the decoding circuit DB, and that the storing operation takes place at an instant distant enough for instance during the characteristic moment $m4$, in order that impulse *tam* does not coincide with impulse M1.

If the distant clock deviates with respect to the local clock, the time interval, which separates pre-collision damping impulse *tam* — originated from impulses *h* — from impulse M1 — originated from impulse H— will get reduced. As soon as there is collision the exclusion circuit XC, at the end of an output frame — that is to say in presence of H —$t'31$ provided during each time slot $t31$ by the decoding circuit DT — does no longer provide, as previously, the reading impulse during moment $m1$. According to the principle of the invention, the reading impulse *lec* is then provided during the moment $m5$. Since the time interval separating impulse M1 from impulse M5 is longer than the duration of the pre-collision impulse *tam* it is assured that the latter and the reading impulse *lec* do not coincide. The deviation of the distant clock being continuous, at the end of a relatively long period of time, the deviations being slow with respect to the duration of a frame, the impulses *lec* and *tam* will again be in coincidence. In the manner, as described above, the impulse *lec* will no longer be provided during the characteristic moment $m5$ but will be provided during the characteristic moment $m1$. Chances of writing/reading simultaneity are therefore avoided.

Now will be described, in referring to FIGS. 3 and 4, an embodiment of the exclusion circuit XC.

The exclusion circuit XC in FIG. 3 comprises essentially four AND gates AN1, AN2, AN3 and AN4, an RS flip-flop FF1, a D flip-flop FF2, a circuit RT introducing a delay 0 and an OR gate PS1.

Gate AN1 receives, namely, the impulses M1, *lec* and *tam* as well as the impulse $t'31$. It provides an output signal *an*1 to the set input of flip-flop FF1.

Gate AN2 receives, namely, the impulses M5, *lec*, *tam* and $t'31$. It provides an output signal *an*2 to the reset input of flip-flop FF1.

Flip-flop FF1 provides a signal *ff*11 on its direct output connected to the input D of flip-flop FF2. This latter receives also the impulses M7 on its clock input. It provides a signal *ff*21 on its direct output connected to an input of logic gate AN3, and a signal *ff*20 on its complementary output connected to an input of logic gate AN4. Impulses M5 and M1 are provided to another input of gates AN3 and AN4 respectively. These two gates provide a signal *an*3 and *an*4 respectively to logic gate PS1.

OR gate PS1 provides signal *lec*, in direction of the reading addresses decoding circuit DL, to an input of AND gates AN1 and AN2, and, to the input of circuit RT.

Signal *lec* delayed by a period of time $\theta$ by circuit RT becomes signal *oec* and enables the storing into input register RM, in FIG. 1, of the word read in memory MD.

It is assumed that, with respect to the output frame, the storing operations are performed during the characteristic moments m7; the reading operations are performed during moments m1.

Flip-flop FF1 is originally in position 0 as well as flip-flop FF2. This latter's output signal ff20 is "1." The gate AN4 therefore retransmits impulse M1 in the form of an impulse an4. Gate PS1 provides therefore a reading signal lec practically identical to impulse M1. The result is that the reading in the memory is performed during moment m1 and that the storing into the output register RM, of the read combination, takes place after a delay θ. The transfer of that combination into register RS takes place at the next moment m0.

It will then be assumed that the clock being, for instance, faster than the distant clock, the trailing edge of the pre-collision signal tam is provided after the appearance of the trailing edge of impulse M1 (FIG. 4). The impulse lec remains provided in response to impulse M1 until the end of the frame.

As soon as impulse t'31 originates, provided by the decoding circuit DT during the first time slot t31 following the coincidence of impulses M1 and tam, gate An1 — all the inputs of which are at logic level 1 — provides a collision signal an1 of logic level 1 to the set input of flip-flop FF1. This flip-flop triggers and provides a signal ff11 of logic level 1 to input D of flip-flop FF2.

At the originating of the leading edge of impulse M7, provided during the last characteristic moment m7 of the time slot t31 to the clock input of flip-flop FF2, this later triggers onto position 1. It therefore provides a signal ff21 of logic level 1 and a signal ff20 of logic level 0.

At the originating of impulse M1, provided during the characteristic moment m1 of the time slot t0 of the next frame, gate AN4 — an input of which receives a signal ff20 of logic level 0 — provides a signal an4 of logic level 0. Gate AN3, an input of which receives an impulse M5 of logic level 0, provides a signal an3 of logic level 0.

Gate PS1, the two inputs of which are at logic level 0, provides a signal lec of logic level 0.

Thus, the exclusion circuit XC in FIG. 3 has detected the imminence of a simultaneity between the reading and writing operations in the memory and, in order to avoid this simultaneity, has cancelled the reading operation which normally had to take place during the characteristic moment m1 of time slot t0.

As soon as the next impulse M5 appears, provided during the characteristic moment m5 of the time interval t0, gate AN3, whose two inputs are at logic level 1, provides a signal an3 of logic level 1 to an input of the OR gate PS1. This latter provides therefore a signal lec of logic level 1.

This signal is provided, on the one hand, to the gates AN1 and AN2, which remain blocked by the signals tam and t'31 at logic level 0 and, on the other hand, to the circuit RT which therefore provides a signal oec of logic level 1 after a period of time θ. This storing order signal is transmitted to the output register RM (FIG. 1). When signal lec passes onto logic level 0, the signal oec will then pass onto logic level 0 after a delay θ.

At the originating of the trailing edge of next impulse M7, provided during the characteristic moment m7 of the time slot t0, flip-flop FF2 remains in position 1; flip-flop FF1 being maintained in position 1.

It is assumed that the progressing goes on and that the signal tam arrives into coincidence with impulse M5. At end of frame impulse t'31 is provided and gate AN2, all the inputs of which are at logic level 1 at the moment m5 of time slot t31, is enabled. It provides a collision signal an2 of logic level 1. This signal triggers flip-flop FF1 into position 0. The output signal ff1 of this flip-flop passes onto logic level 0. At the beginning of next impulse M7 (during the time slot t31), flip-flop FF2 passes onto position 0 and therefore provides a signal ff20 of logic level 1. At the originating of next impulse M1 provided during the characteristic moment m1 of the time slot t0 of next frame, gate AN4 is enabled and it retransmits impulse M1 to the gate PS1 which retransmits it in the form of a reading impulse lec.

Signal oec of logic level 1 is provided in an identical manner to the one described above.

This then leads back to initial state of conditions.

Thus, as soon as there is a risk of simultaneity between the reading operations and the writing operations, the exclusion circuit will detect that risk and will command, at end of frame, the time shifting of the reading operations. This time shifting consists in providing the reading signal in the same time slot but in another moment distant enough for keeping back any risk of writing/reading simultaneity in the next frame. Thus, one reading operation and one only is always performed during each time slot.

Figure 5:
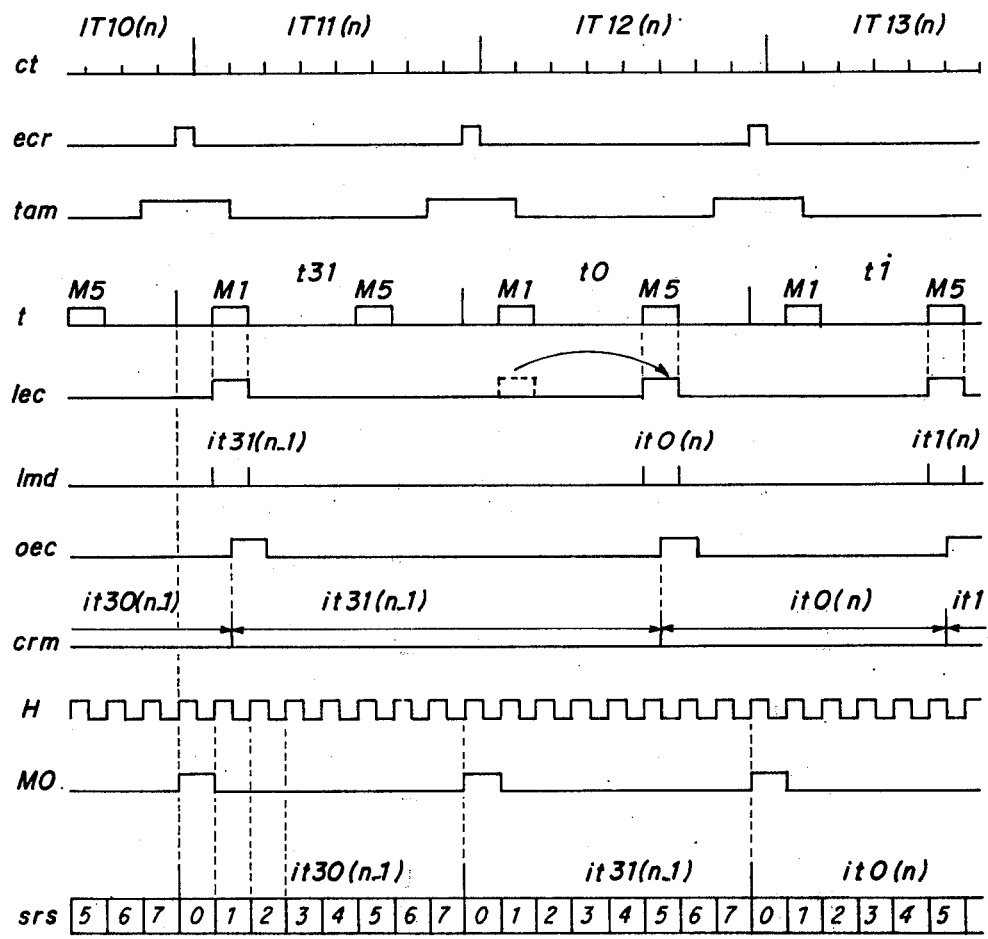
FIG. 5 shows chronograms that illustrate the progressing of the coded combinations when a time-shifting of the reading operations takes place, conformable to present invention.

Now will be described, in referring to the chronograms of FIG. 5, the progressing of the bits of coded combinations in the various elements of the circuit in FIG. 1, when a time shifting of the reading operations takes place.

It is assumed that the local clock HL, being faster than the distant clock, the time interval separating the storing impulse ecr — provided at the end of the storing of the eighth bit of the coded combination into the input register RE during the time slot IT10 of frame n — from the leading impulse lec — provided during the characteristic moment m1 of the time slot t31 — reduces sufficiently so that the impulse M1 of that time slot be provided before the corresponding pre-collision impulse tam should disappear. The exclusion circuit XC undertakes the shifting operations in the manner described above.

The reading operation out of memory MD is performed at the address t1 provided by counter NL (FIG. 1). At that instant, cells md0 to md10 of the junction memory MD contain the coded combinations it0 (n) to it10 (n) respectively, and memory cells md11 to md31 contain the coded combinations it11 (n−1) to it31 (n−1). According to the example chosen here, the contents of memory cell md31 is read. This memory cell contains the coded combination it31 of the time slot IT31 of the foregoing frame, that is the combination it31 (n−1), as is indicated by the chronogram lmd. As was already seen above, a storing order impulse oec is provided after the θ delay. This impulse determines the storing of the coded combination it31 (n−1) into the output register RM which contained previously the coded combination it31 (n−1) as is indicated by the chronogram crm.

The originating of impulse M5 provided during the characteristic moment m5 of the time slot t31 is without any effect on the routing of the coded combinations.

The originating of the next storing impulse ecr causes the storing of the coded combination it11 (n) into cell md11 of the junction memory MD in lieu of combination it11 (n−1) which is thus removed.

An impulse M0 is provided at the first characteristic moment m0 of the time slot t0. This impulse causes the storing of the contents of register RM, that is to say the coded combination it31 (n−1), into the second output register RS. This latter enables either the availability of the eight bits of that combination during the 3.9μs of the time slot t0, or the retransmission in series of these eight bits at the rate of 2.048,10⁶ bits per second (chronogram srs in FIG. 5).

Impulse M1, provided subsequently, is without any effect: the exclusion circuit having triggered provides a reading signal of logic level 0 in the manner already described above.

Impulse M5, provided during the sixth characteristic moment m5 of the time slot t0, causes the passage of the reading signal lec to logic level 1. The contents of memory cell md0 is read. This cell contains the coded combination it0 (n). At the originating of the storing order impulse oec this combination is stored into the output register RM, whose previous contents — combination it31 (n−1) has been stored into the second output register RS.

The next storing impulse ecr causes the storing of the coded combination it12 (n) into cell md12 of the junction memory MD, and, operation of the resynchronisation circuit in FIG. 1 proceeds in the manner described above. It is seen therefore that the shifting of the reading operations in memory from characteristic instant m1 to characteristic instant m5 was performed without any perturbation and that, at the output of register RS, the coded combinations are provided in synchronism with the time intervals of channels t0 to t31. It is worth noting a shift of a time slot t (3.9μs) between the local clock and the output of the second input register RS. Indeed, during the time slot t0, that register retransmits the coded combination it31. A 5 stage shift register, associated with counter DT, storing the code of the IT's delayed by a time slot, enables to palliate this delay.

It could be shown, that same applies at a shifting of the memory reading operation from characteristic moment m5 to characteristic moment m1 whatever be the relative variation direction of the two clocks.

The local clock, according to the example chosen here, is faster than the distant clock. On the chronograms in FIG. 5 this can be illustrated by a shifting of the three first chronograms ct, ecr and tam onto the right. The successive shiftings of the reading operations will then be performed, without any perturbation, in the manner described above. Nevertheless, perturbations may arise when the two clocks are going to be in phase.

Figure 6:
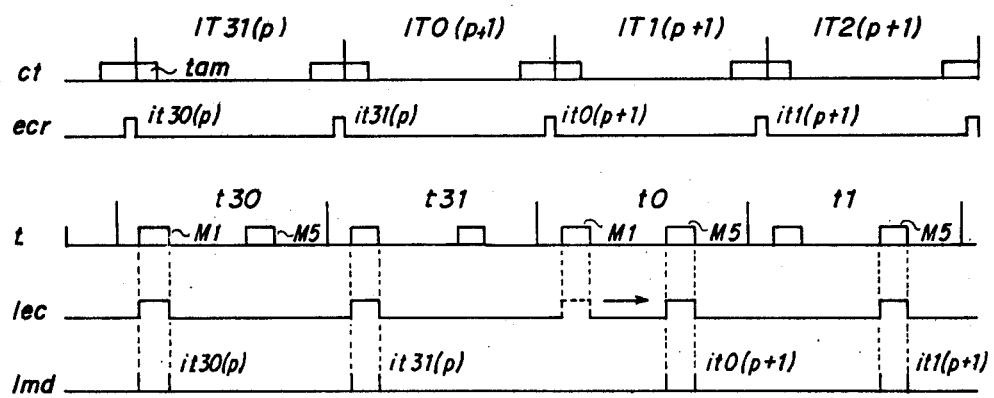
FIGS. 6 and 7 show chronograms illustrating the time-shifting operations of the reading out of the memory, conformable to the present invention, when the storing and reading operations or the reading and storing operations are performed in succession on the same address in the memory.
Figure 7:
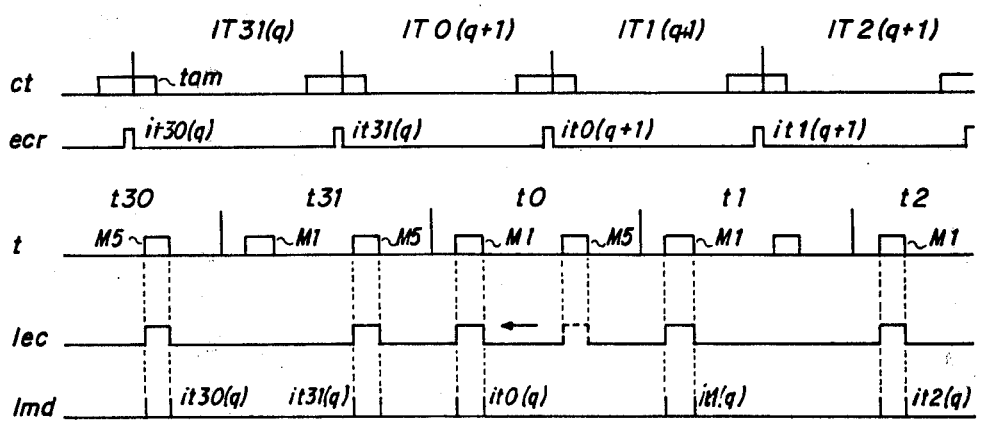

There will therefore be described now, in referring to the chronograms in FIGS. 6 and 7, the routing of the bits of the coded combinations in the various elements of the circuit in FIG. 1 at a time shifting of the memory reading operations, the dephasing between the local clock and the distant clock being inferior to 3.9μs. As previously assumed above, it will be assumed that the local clock HL is faster than the distant clock.

It is first supposed that, as the chronograms in FIG. 6 show, the reading operations take place during the moment m1. The storing impulse ecr provided at the end of the time slot IT31 (p), controls the storing of the coded combination it31 (p) in the cell md md31 of junction memory MD. The cells md0 to md31 of that memory therefore contain coded combinations it0 (p) to it31 (p) respectively.

The reading impulse lec subsequently provided during the time slot t31 controls the reading of contents it31 (p) of the memory cell md31. According to the process already described, this combination is stored successively into the output registers RM and RS.

The storing impulse ecr provided at end of the time slot IT0 (p+1) controls the storing of the coded combination it0 (p+1) into the cell md0 of memory MD.

A collision happens between signal M1 and the precollision signal tam during reading of the output frame p in the conditions already described. Consequently, the exclusion circuit XC generates a reading signal lec at the beginning of impulse M5 of time slot t0 of the frame p+1. This impulse controls the reading of contents of memory cell md0, that is to say of the coded combination it0 (p+1).

The operation proceeds in the manner already described. Time shifting of the reading operations of m1 in m5 has not therefore brought any perturbation.

The local clock being more rapid than the distant clock, after several frames, time interval separating impulse M5 from impulse tam, diminishes so as to finally cancel as is shown by the chronograms in FIG. 7.

The storing impulse ecr, provided at end of the time slot IT31 (q) controls the storing of coded combinations it31 (q) into the cell md31 of memory MD. Cells md0 to md31 of that memory contain therefore the coded combinations it0 (q) to it31 (q) respectively.

Reading impulse lec provided at the instant m5 of time slot t31 controls the reading of coded combination it31 (q). The collision of impulses M5 and tam will trigger the exclusion circuit XC. This latter provides a reading impulse lec at the moment m1 of time slot t0. This impulse is therefore provided before the next storing impulse ecr. It controls the reading of contents of the memory cell md0, that is to say the coded combination it0 (q).

The next storing impulse ecr controls the storing of the coded combination it0 (q+1) into memory cell md0 and, the next reading impulse lec controls the reading of combination it1 (q) stored in memory cell md1; and so on.

The time shifting of the reading operations of m5 to m1 therefore has, this time, brought a perturbation: frame q is read twice. This perturbation is inevitable in asynchronous operation.

Therefore, when the local clock is more rapid than the distant clock, the time shifting of the reading operations will not bring any perturbation (FIG. 6) or cause the doubling of a frame (FIG. 7).

By means of an identical reasoning it can be shown that the local clock being less rapid than the distant clock, the time shifting of the reading operations will bring no perturbation or cause the skipping of a frame.

These two inevitable perturbations set apart, the resynchronisation circuit in present invention — which is a simple circuit little costly and easily adaptable to operation in synchronous network — therefore enables detecting and avoiding any collision between the reading and writing operations.

In the foregoing description above, it has been assumed that the impulse tam frames the storing signal ecr. Operating process of the device in present invention would be identical in the case where a pre-collision impulse, framing the reading signal lec, would be used.

Likewise, without departing from the scope of the present invention, time shifting of the storing operations can be considered; the reading operations being then performed always during the same characteristic moment of the local time slots. Moreover, the shift operations can be made during a whatever local time slot (t0 to t31), the selection of the time slot t31 making it possible to perturbate all the time slots of one same frame; which is an advantage in certain applications (Widebandtime switching, for instance.

We claim:

1. A synchronizing circuit for a time division multiplex system having an exchange in which a series of plural bit words is received during successive time frames comprising a time slot for each word with each bit being received serially during a time element of a time slot and with each word being received at the clock rate of a distant office from which the series of words is transmitted, each word being forwarded within said exchange at a local clock rate of the same duration and extent as the clock rate of the distant office, said circuit including a memory for storing therein a word in parallel form in response to a storage signal based on said distant clock rate during a time element thereof, means in said exchange for sensing the occurrence of a storage signal, means responsive to a read signal during a preselected time element for reading a bit from said memory, means for comparing a check signal derived from said storage signal but longer in duration than said storage signal against said read signal for reading a word from said memory to ensure that only one word is read during a time slot, means responsive to a condition in which a check signal coincides with a read signal for shifting said read signal to a time element spaced in time a predetermined plural number of time elements from the present time interval, and means for causing reading of words at successive shifted time elements of subsequent time slots to prevent reading and storing of words at the same time.

2. A synchronizing circuit as claimed in claim 1, in which said comparing means comprises a gate circuit, said shifting means comprises a second gate circuit and a bistable member, and said causing means comprises a further bistable member.

3. A synchronizing circuit as claimed in claim 1, in which there are further gate circuits for restoring said read signal to said preset time element on coincidence of signals at said shifted element.

4. A process for preventing coincidence of writing operations into and reading operations out of a plural bit memory within a time division controlled system in which each operation occurs in a certain time element within a plural element time slot, in which the writing operation is controlled by one signal generated by one clock and the reading operation is controlled by a signal derived from another clock, and in which the write control signal is generated to control the writing operation and the read control signal is generated to control the reading operation during a preset time element, and in which the control signals are spaced apart with the clocks in synchronism, the process including the steps of deriving a check signal from the write control signal with the check signal extending for a like time period before the start of and after the end of the write control signal, feeding the check signal for a coincidence check against a read control signal, and for responding to a coincidence of said last mentioned signals for shifting the read control signal to another predetermined time element within the time slot, with said other time element spaced from the check signal by more than one time element when said clock derived signals are in synchronism, and for maintaining successive read control signals at like predetermined elements within subsequent time slots.

5. A process as claimed in claim 4, in which a coincidence check is continuously made between check signals and the read control signal for shifting the read control back to the preset element.

* * * * *